(12) United States Patent
Zhou et al.

(10) Patent No.: US 11,782,478 B2
(45) Date of Patent: Oct. 10, 2023

(54) UNLOCKING CONTROL METHOD AND RELATED PRODUCTS

(71) Applicant: GUANGDONG OPPO MOBILE TELECOMMUNICATIONS CORP., LTD., Guangdong (CN)

(72) Inventors: Yibao Zhou, Guangdong (CN); Haiping Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 372 days.

(21) Appl. No.: 16/626,938

(22) PCT Filed: Jul. 17, 2018

(86) PCT No.: PCT/CN2018/095940
§ 371 (c)(1),
(2) Date: Dec. 27, 2019

(87) PCT Pub. No.: WO2019/015573
PCT Pub. Date: Jan. 24, 2019

(65) Prior Publication Data
US 2020/0209917 A1    Jul. 2, 2020

(30) Foreign Application Priority Data

Jul. 18, 2017   (CN) .................. 201710586504.X

(51) Int. Cl.
*G06F 1/16* (2006.01)
*G06F 21/32* (2013.01)
*H04L 9/40* (2022.01)

(52) U.S. Cl.
CPC .......... *G06F 1/1616* (2013.01); *G06F 1/1652* (2013.01); *G06F 1/1684* (2013.01); *G06F 21/32* (2013.01); *H04L 63/0861* (2013.01)

(58) Field of Classification Search
CPC .... G06F 1/1616; G06F 1/1641; G06F 1/1652; G06F 1/1684; G06F 21/32; H04L 63/0861
See application file for complete search history.

(56) References Cited

U.S. PATENT DOCUMENTS

| 2012/0239950 A1 | 9/2012 | Davis et al. | |
| 2014/0160055 A1* | 6/2014 | Margolis | G06F 1/1684 345/173 |

(Continued)

FOREIGN PATENT DOCUMENTS

| CN | 104423553 | 3/2015 |
| CN | 105117698 | 12/2015 |

(Continued)

OTHER PUBLICATIONS

IPI, Office Action for in Application No. 202017001995, dated Sep. 15, 2021.

(Continued)

*Primary Examiner* — Farid Homayounmehr
*Assistant Examiner* — Brian William Avery
(74) *Attorney, Agent, or Firm* — Hodgson Russ LLP

(57) ABSTRACT

The embodiment of the disclosure provides an unlocking control method and related products, applied to an electronic device with a foldable and flexible display. The method includes: determining a current page to be unlocked; determining N target biometric recognition devices corresponding to the current page to be unlocked, N being a positive integer; acquiring a current multi-biometric recognition mode, wherein the current multi-biometric recognition mode comprises at least two recognition operations, each recognition operation corresponds to one kind of biometric recognition device; and adjusting the current multi-biometric recognition mode according to the N target biometric recognition devices. So, the current multi-biometric recognition (Continued)

mode is adjustable according to the biometric recognition devices corresponding to the page to be unlocked. Therefore, the problem that a foldable and flexible display is inconvenient to be unlocked in a folded state, can be solved.

17 Claims, 6 Drawing Sheets

(56) References Cited

U.S. PATENT DOCUMENTS

| | | | |
|---|---|---|---|
| 2016/0234024 A1 | 8/2016 | Mozer | |
| 2016/0337403 A1* | 11/2016 | Stoops | H04W 12/065 |
| 2016/0381014 A1* | 12/2016 | Kim | G06F 1/1616 |
| | | | 726/7 |
| 2018/0234464 A1* | 8/2018 | Sim | H04L 9/3213 |

FOREIGN PATENT DOCUMENTS

| | | |
|---|---|---|
| CN | 105205380 | 12/2015 |
| CN | 105453019 | 3/2016 |
| CN | 105955610 | 9/2016 |
| CN | 106250751 | 12/2016 |
| CN | 106383639 | 2/2017 |
| CN | 106446625 | 2/2017 |
| CN | 107480489 | 12/2017 |

OTHER PUBLICATIONS

WIPO, ISR for No. PCT/CN2018/095940, dated Oct. 11, 2018.
SIPO, First Office Action for CN Application No. 201710586504.X, dated May 8, 2019.
EPO, Office Action for EP Application No. 18834514.4, dated Apr. 2, 2020.

* cited by examiner

UNLOCKING CONTROL METHOD AND RELATED PRODUCTS

This application is a U.S. national phase application of International Application No. PCT/CN2018/095940, filed Jul. 17, 2018, which claims priority to Chinese application No. 201710586504.X filed on Jul. 18, 2017. The entire disclosures of the above-mentioned applications are hereby incorporated by reference herein.

TECHNICAL FIELD

The present disclosure relates to the field of electronic device technologies, and more particular, to an unlocking control method and related products.

BACKGROUND

With the widespread use of electronic devices such as mobile phones, tablets, and the like, more and more applications can be supported by the electronic devices, and thereby their functions are becoming more and more powerful. Electronic devices are developing in a diversified and personalized way and becoming indispensable for users.

At present, multi-biometric recognition is increasingly favored by electronic device manufacturers. Multi-biometric recognition improves security, but it is not convenience for an electronic device having a foldable and flexible display. For example, when it is in a folded state, the display can be used as a number of independent screens, it is not convenient to unlock one of the screens. Specifically, in the case of two independent screens, a screen A and a screen B, the screen A contains a fingerprint recognition device, and the screen B contains an iris recognition device, the user has to perform fingerprint recognition on the screen A side, and then perform iris recognition on the screen B side.

SUMMARY

An embodiment of the disclosure provides an unlocking control method and related products, to solve the problem that a foldable and flexible display is inconvenient to be unlocked in a folded state.

In a first aspect, an embodiment of the disclosure provides an electronic device, which includes a foldable and flexible display, an application processor, and a memory, the foldable and flexible display and the memory both are connected to the application processor, wherein the foldable and flexible display is configured to determine a current page to be unlocked; the memory is configured to store a current multi-biometric recognition mode, the current multi-biometric recognition mode includes at least two recognition operations, each recognition operation corresponds to a biometric recognition device;

the application processor is configured to:
determine N target biometric recognition devices corresponding to the current page to be unlocked, where N is a positive integer,
acquire the current multi-biometric recognition mode, and adjust the current multi-biometric recognition mode according to the N target biometric recognition devices.

In a second aspect, an embodiment of the disclosure provides an unlocking control method, which is applied to an electronic device having a foldable and flexible display. The method comprises:
determining a current page to be unlocked;
determining N target biometric recognition devices corresponding to the current page to be unlocked, N being a positive integer;
acquiring a current multi-biometric recognition mode, wherein the current multi-biometric recognition mode comprises at least two recognition operations, each recognition operation corresponds to one kind of biometric recognition device; and
adjusting the current multi-biometric recognition mode according to the N target biometric recognition devices.

In a third aspect, an embodiment of the disclosure provides an unlocking control device, applied to an electronic device having a foldable and flexible display; the unlocking control device includes:
a first determining unit, configured to determine a current page to be unlocked;
a second determining unit, configured to determine N target biometric recognition devices corresponding to the current page to be unlocked, N being a positive integer;
a first acquiring unit, configured to acquire a current multi-biometric recognition mode, wherein the current multi-biometric recognition mode comprises at least two recognition operations, each recognition operation corresponds to one kind of biometric recognition device; and
an adjusting unit, configured to adjust the current multi-biometric recognition mode according to the N target biometric recognition devices.

In a fourth aspect, an embodiment of the disclosure provides an electronic device including a foldable and flexible display, an application processor, a memory and one or more programs, the one or more programs are stored in the memory and is configured to be executed by the application processor, the one or more programs includes instructions configured to perform part of or all steps of the second aspect.

In a fifth aspect, an embodiment of the disclosure provides a computer readable storage medium. The computer readable storage medium a computer program for electronic data exchange, the computer program is configured to enable the computer to perform part of or all steps of the second aspect.

In a sixth aspect, an embodiment of the disclosure provides a computer program product. The computer program product includes a non-transitory computer readable storage medium storing a computer program, the computer program is executable to enable the computer to perform part of or all steps of the second aspect. The computer program product can be a software installation package.

The implementation of the embodiments of the disclosure has the following effects.

It can be seen that the embodiment of the disclosure includes operations of: determining a current page to be unlocked; determining N target biometric recognition devices corresponding to the current page to be unlocked, N being a positive integer; acquiring a current multi-biometric recognition mode, wherein the current multi-biometric recognition mode comprises at least two recognition operations, each recognition operation corresponds to one kind of biometric recognition device; and adjusting the current multi-biometric recognition mode according to the N target biometric recognition devices. So, the current multi-biometric recognition mode is adjustable according to the biometric recognition devices corresponding to the page to be unlocked. Therefore, the problem that a foldable and flexible display is inconvenient to be unlocked in a folded state, can be solved.

BRIEF DESCRIPTION OF THE DRAWINGS

In order to more clearly illustrate the embodiments of the disclosure or the technical solutions in the prior art, the drawings to be used in the embodiments or the prior art are briefly described below. Obviously, the following drawings are just for certain embodiments of the disclosure, and other drawings can be obtained according to these drawings without any creative effort for those skilled in the art.

DETAILED DESCRIPTION OF PREFERRED EMBODIMENTS

Figure 1A:
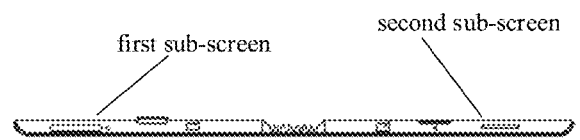
FIG. 1A is a schematic structural diagram of an electronic device according to an embodiment of the disclosure.

The technical solutions in the embodiments of the disclosure are clearly and completely described in the following with reference to the accompanying drawings of the embodiments, in order to enable those skilled in the art to better understand the disclosure. The embodiments described are just some of the disclosure but not all of the embodiments. All other embodiments obtained based on the embodiments of the disclosure without creative effort, by those skilled in the art, are within the scope of the disclosure.

The terms "first", "second" and the like in the specification and claims of the disclosure and the above drawings are used to distinguish different objects, and are not intended to describe a specific order thereof. The terms "comprising" and "having" and any variants thereof are intended to cover a non-exclusive inclusion. For example, a process, method, system, product, or device that comprises a series of steps or units is not limited to the listed steps or units, but optionally also includes not listed steps or units, or alternatively other steps or units inherent to the process, method, product, or device.

The "embodiment" mentioned in the disclosure means that, a particular feature, structure, or characteristic described in connection with the embodiment can be included in at least one embodiment of the disclosure. This term appeared in various positions of the specification is not necessarily referring to the same embodiment, and is not exclusive or alternative embodiment that is mutually exclusive with other embodiments. Those skilled in the art will understand obviously and implicitly that the embodiments described herein can be combined with other embodiments.

The electronic device referred to in the embodiments of the disclosure may include various handheld devices having wireless communication functions, in-vehicle devices, wearable devices, computing devices, or other processing devices connected to a wireless modem, and various forms of user equipment (UE), mobile station (MS), terminal device, etc. For convenience of description, the devices mentioned above are collectively referred to as electronic devices. Embodiments of the disclosure are described in detail below.

It should be noted that the electronic device in the embodiment of the disclosure may be installed with a multi-biometric recognition device, and the multi-biometric recognition device may be composed of a number of biometric recognition devices. The biometric recognition devices may include, but are not limited to, a fingerprint recognition device, an iris recognition device, a face recognition device, a vein recognition device, an electroencephalogram recognition device, an electrocardiogram recognition device, and the like, each of the biometric recognition devices has a corresponding recognition algorithm and a recognition threshold, and each of the biometric recognition devices has a corresponding template pre-recorded by a user. For example, the fingerprint recognition device has a preset fingerprint template corresponding thereto. Further, the fingerprint recognition device can collect a fingerprint image, and pass the recognition when a matching value between the fingerprint image and the preset fingerprint template is greater than a corresponding recognition threshold.

Further, a multi-biometric recognition mode in the embodiment of the disclosure may include two or more recognition operations, for example, a fingerprint recognition is performed at first, and then a face recognition can be performed after the passing of the fingerprint recognition, or, the fingerprint recognition and the face recognition can be performed synchronously. The multi-biometric recognition mode has better security than the single biometric recognition mode (for example, unlocking by fingerprint recognition), and thus, the multiple biometric recognition modes are becoming more and more popular.

In addition, the electronic device in the embodiment of the disclosure is provided with one or two foldable and flexible displays, which can be folded back and forth, or can be folded left and right, or can be folded up and down, or can be folded in other directions. The foldable and flexible display can form a number of display areas after folding, each of the display areas can be regarded as a display screen that is capable of display independently, and each display screen can include at least one biometric recognition device. As illustrated in FIG. 1A, the electronic device may include, after folding, a first sub-screen and a second sub-screen. The first sub-screen and the second sub-screen may be used independently, and of course, may be displayed or unlocked independently.

Figure 1B:
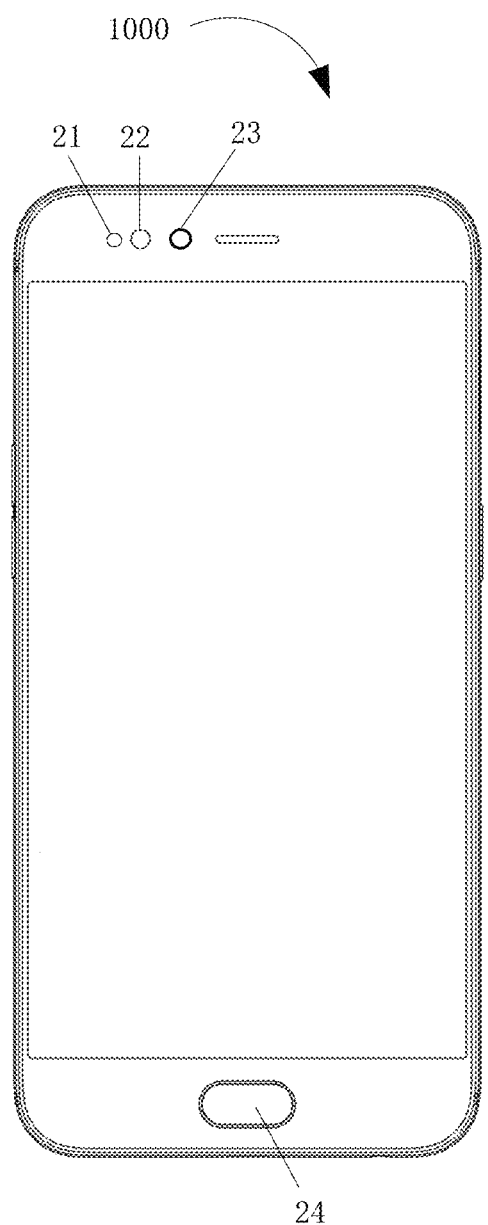
FIG. 1B is a schematic structural diagram of a smart phone according to an embodiment of the disclosure.

The embodiments of the disclosure are described in detail below. FIG. 1B illustrates an exemplary smart phone 1000, an iris recognition device of the smart phone 1000 may include an infrared fill light 21 and an infrared camera 22. During a working process of the iris recognition device, an infrared light emitted from the infrared fill light 21 reaches the iris, and is reflected by the iris and then back to the infrared camera 22, so the iris recognition device can capture images of the iris. A front camera 23 can be used as a face recognition device, a fingerprint recognition device 24 is provided, and a display screen of the electronic device can be a foldable and flexible display. After folding, two display screens can be formed, wherein one display screen includes an iris recognition device and the other display screen includes a fingerprint recognition device. During a using process of the two display screens, if the original multi-biometric recognition mode includes a fingerprint recognition and an iris recognition, it is not convenient enough to operate, and thus can be optimized by the embodiments of the disclosure described below.

Figure 1C:
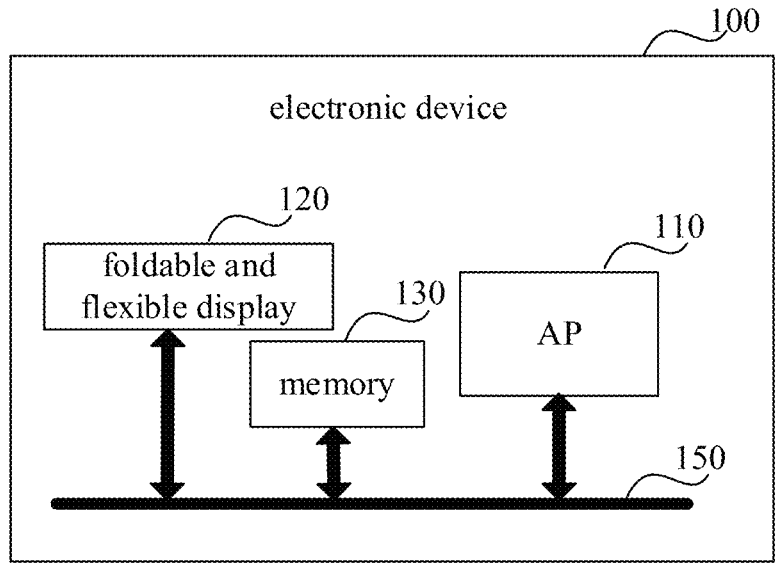
FIG. 1C is a schematic structural diagram of another electronic device according to an embodiment of the disclosure.

Referring to FIG. 1C, FIG. 1C is a schematic structural diagram of an electronic device 100. The electronic device 100 includes an application processor (AP) 110, a foldable and flexible display 120, and a memory 130. The foldable and flexible display 120 and the memory 130 are connected to the AP 110 through a bus 150.

In one possible embodiment, the foldable and flexible display 120 is configured to determine a page waited to be unlocked.

The memory 130 is configured to store a current multi-biometric recognition mode, where the current multi-biometric recognition mode includes at least two recognition operations, each recognition operation corresponds to a biometric recognition device.

The AP 110 is configured to determine N target biometric recognition devices corresponding to the current page which is waited to be unlocked, where N is a positive integer. The AP 110 also is configured to acquire the current multi-biometric recognition mode, and adjust the current multi-biometric recognition mode according to the N target biometric recognition devices.

In one embodiment, when determining N target biometric recognition devices corresponding to the current page, the AP 110 is specifically configured to:
  detect that the current page to be unlocked is located in a hardware portion of the foldable and flexible display; and
  determine the N target biometric recognition devices based on the hardware portion.

In one embodiment, when adjusting the current multi-biometric recognition mode according to the N target biometric recognition devices, the AP 110 is specifically configured to:
  obtain M biometric recognition devices corresponding to the current multi-biometric recognition mode, where M is a positive integer;
  determine one or more recognition types that the M biometric recognition devices do not present in the N target biometric devices, and thereby to obtain X recognition types, where X is a positive integer; and
  subtract one or more recognition operations corresponding to the X recognition types from the current multi-biometric recognition mode.

In one embodiment, when adjusting the current multi-biometric recognition mode according to the N target biometric recognition devices, the AP 110 is specifically configured to:
  acquire a target multi-biometric recognition mode corresponding to the N target biometric recognition devices, wherein the target biometric recognition mode includes at least one recognition operation, the at least one recognition operation corresponds to one of the N target biometric recognition devices;
  compare the target multi-biometric recognition mode with the current multi-biometric recognition mode; and
  replacing the current multi-biometric recognition mode with the target multi-biometric recognition mode when the target multi-biometric recognition mode is inconsistent with the current multi-biometric recognition mode.

In one embodiment, when acquiring the current multi-biometric recognition mode, the AP 110 is specifically configured to:
  acquire the current geographic location; and
  determine the current multi-biometric recognition mode, according to a correspondence between predetermined geographic locations and multi-biometric recognition modes.

In one embodiment, the AP 110 is also specifically configured to:
  acquire a time difference between an entry time entering the current page to be unlocked and a last successful unlocking time;
  wherein the operation of adjusting the current multi-biometric recognition mode according to the N target biometric recognition devices includes:
  adjusting the current multi-biometric recognition mode according to the N target biometric recognition devices and the time difference.

Figure 1D:
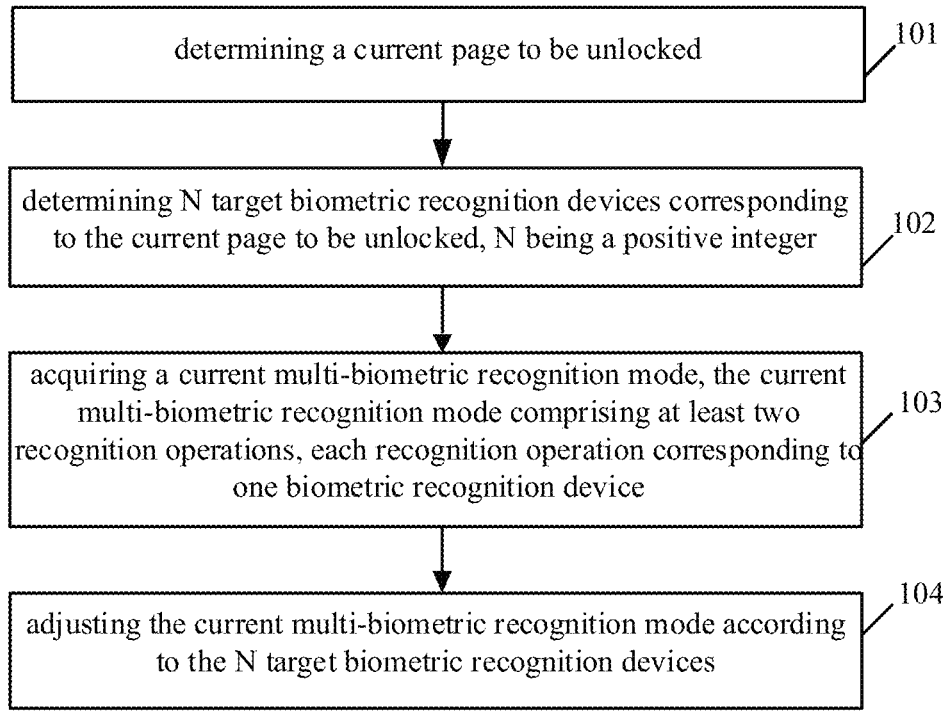
FIG. 1D is a flowchart of an unlocking control method according to an embodiment of the disclosure.

FIG. 1D is a schematic flowchart of an unlocking control method according to an embodiment of the disclosure. The unlocking control method described in this embodiment is applied to an electronic device, wherein its physical map and structural diagram can be referred to FIG. 1A to FIG. 1C. The unlocking control method described in this embodiment includes the following steps.

At step 101, a current page to be unlocked is determined.

The page to be unlocked may be a page in a state of waiting to be unlocked, for example, a payment waited to be unlocked, or a bright screen waited to be unlocked, or a black screen waited to be unlocked or the like. The electronic device can be in a folded state. After folding, a foldable and flexible display can be used as multiple screens, for example, a screen A and a screen B. The screen A and the screen B can display independently, for example, a game is run on the screen A while the screen B performs a video. In this way, the screen A and the screen B can also be unlocked respectively.

Optionally, the current page waited to be unlocked is a display page of the foldable and flexible display in a folded state.

At step 102, N target biometric recognition devices corresponding to the current page to be unlocked are determined, where N is a positive integer.

The current page waited to be unlocked may correspond to a part of the foldable and flexible display, and the part of the foldable and flexible display may correspond to N target biometric recognition devices, and N is a positive integer. The N target biometric recognition devices may be disposed at the same side of the current page to be unlocked.

Optionally, in the foregoing step 102, the operation of determining N target biometric recognition devices corresponding to the current page to be unlocked may include the following steps:

21, detecting that the current page to be unlocked is located in a hardware portion of the foldable and flexible display;

22, determining the N target biometric recognition devices based on the hardware portion.

The foldable and flexible display may include a number of hardware portions after folding, and each of the hardware portions may be considered as a part of the foldable and flexible display. The current to-be-unlocked page may also correspond to one of the hardware portions of the foldable and flexible display, and the hardware portion may include the N target biometric recognition devices. For example, after folding the foldable and flexible display, a face recognition device is located in the hardware portion of the current page to be unlocked, so the hardware portion corresponding to the current page to be unlocked includes the face recognition device. As such, after folding, the multi-biometric recognition mode can be optimized according to the hardware layout corresponding to the specific page waited to be unlocked, thereby facilitating the user to be recognized by the multi-biometric recognition and improving experience of users.

At step 103, a current multi-biometric recognition mode is acquired, and the current multi-biometric recognition mode includes at least two recognition operations, each recognition operation corresponds to one kind of biometric recognition device.

The multi-biometric recognition mode may include at least two recognition operations, the recognition operations each are implemented by and correspond to one kind of biometric recognition device. For example, one certain multi-biometric recognition mode includes recognition operations A1, B1, and C1. The recognition operation A1 may adopt the face recognition, the operation B1 may use the iris recognition, and the recognition operation C1 may employ the fingerprint recognition. For another example, another multi-biometric recognition mode includes recognition operations A2, B2, and C2, the recognition operation A2 can employ the face recognition, the recognition operation B2 can use the fingerprint recognition, and the recognition operation C2 can adopt the face recognition.

In the step 103, the operation of acquiring a current multi-biometric recognition mode may include the following steps:

acquiring a current geographic location, and determining the current multi-biometric recognition mode, according to a correspondence between preset geographic locations and multi-biometric recognition modes.

The correspondence between the preset geographic locations and the multi-biometric recognition modes may be pre-stored in the electronic device. After the current geographic location is determined, the multi-biometric recognition mode corresponding to current geographic location, according to the correspondence between the preset geographic locations and the multi-biometric modes. Different multi-biometric modes can be set in different geographic locations, which can improve the security of the electronic device.

In the step 103, the operation of acquiring a current multi-biometric recognition mode may include the following steps:

acquiring a current time, and determining a current multi-biometric recognition mode corresponding to the current time, according to a correspondence between preset time periods and multi-biometric recognition modes.

The correspondence between the preset time periods and the multi-biometric modes may be pre-stored in the electronic device. After acquiring the current time, a current time period corresponding to the current time can be determined, and further, a multi-biometric recognition mode corresponding to the current time period can be found. Thus, different time periods can correspond to different multi-biometric recognition modes, the multi-biometric recognition modes are diversified, and the security of the electronic device can be improved.

At step 104, the current multi-biometric recognition mode is adjusted according to the N target biometric recognition devices.

In the step 104, the operation of adjusting the current multi-biometric recognition mode according to the N target biometric recognition devices includes:

A1, acquiring M biometric recognition devices corresponding to the current multi-biometric recognition mode, where M is a positive integer;

A2, determining one or more recognition types that the M biometric recognition devices are not within the N target biometric devices, and thereby to obtain X recognition types, where X is a positive integer; and A3, subtracting one or more recognition operations corresponding to the X recognition types from the current multi-biometric recognition mode.

The current multi-biometric recognition mode may correspond to the M biometric recognition devices, and each biometric recognition device may correspond to one recognition type. The recognition types may include, but are not limited to, iris recognition, face recognition, fingerprint recognition, and the like.

For instance, the multi-biometric recognition mode includes recognition operations A1, B1, and C1, the recognition operation A1 may adopt the face recognition, the operation B1 may use the iris recognition, and the recognition operation C1 may employ the fingerprint recognition. Then, the corresponding biometric recognition devices are a face recognition device, an iris recognition device, and a fingerprint recognition device. When the current page waited to be unlocked corresponds to the iris recognition device and the fingerprint recognition device, the fingerprint recognition device does not present in the current page to be unlocked, and thus the recognition operation C1 can be subtracted or removed. In other words, the current multi-biometric recognition mode corresponds to the M biometric recognition operations, the M biometric recognition operations correspond to M recognition types respectively. The N target biometric recognition devices correspond to N recognition types respectively. When M is larger than N, the N recognition types partially or totally are included in the M recognition types, and there are some recognition types are not overlapped and are not existed in the N target biometric recognition devices. For example, at least M-N recognition types are not existed in and identified from the M recognition types, and in this case the M-N recognition types are equal to the X recognition types. Then the current multi-biometric recognition mode is adjusted or modified to remove one or more recognition operations corresponding to the X recognition types therefrom. That means, X recognition operations, which are corresponding to the X recognition types, are removed from the current multi-biometric recognition mode. In this case, the adjusted multi-biometric recognition mode includes M−X=N recognition operations.

In the above step 104, the operation of adjusting the current multi-biometric recognition mode according to the N target biometric recognition devices may include the following steps:

B1, acquiring a target multi-biometric recognition mode corresponding to the N target biometric recognition devices, wherein the target biometric recognition mode includes at least one recognition operation, the at least one recognition operation corresponds to one of the N target biometric recognition devices;

B2, comparing the target multi-biometric recognition mode with the current multi-biometric recognition mode; and B3, replacing the current multi-biometric recognition mode with the target multi-biometric recognition mode when the target multi-biometric recognition mode is inconsistent with the current multi-biometric recognition mode.

A number of multi-biometric recognition modes may be pre-stored in the electronic device, and the target multi-biometric recognition mode corresponding to the N target biometric devices may be acquired, where the target multi-biometric recognition mode includes at least one recognition operation, the at least one recognition operation corresponds to one of the N target multi-biometric recognition devices. Therefore, the target multi-biometric recognition mode can be compared with the current multi-biometric recognition mode, when the two are inconsistent, the current multi-biometric recognition mode can be switched to the target multi-biometric recognition mode As such, the biometric recognition devices corresponding to the current page to be unlocked can be utilized to operate the unlocking, which greatly facilitates the user and improves the user experience.

For example, if a certain page to be unlocked has a fingerprint recognition device and a face recognition device, and the current multi-biometric recognition mode is first fingerprint recognition, then face recognition, and last iris recognition. Due to that the iris recognition device is not at the page to be unlocked, the current multi-biometric recognition mode can be optimized, that is, the operation of iris recognition can be removed, and after that, the multi-biometric recognition mode can be first fingerprint recognition and then face recognition.

It can be seen that, in the embodiment of the disclosure, the current page to be unlocked is determined, and the N target biometric recognition devices corresponding to the current page to be unlocked are determined, where N is a positive integer. Then a current multi-biometric recognition mode is acquired, where the current multi-biometric recognition mode includes at least two recognition operations, each recognition operation corresponds to one kind of biometric recognition device. The current multi-biometric recognition mode is adjusted according to the N target biometric recognition devices, so that the current multi-biometric recognition mode can be adjusted, according to the biometric recognition devices corresponding to the page to be unlocked. In this way, the problem, that the foldable and flexible display is inconvenient to operate in the folded state, can be solved.

Figure 2:
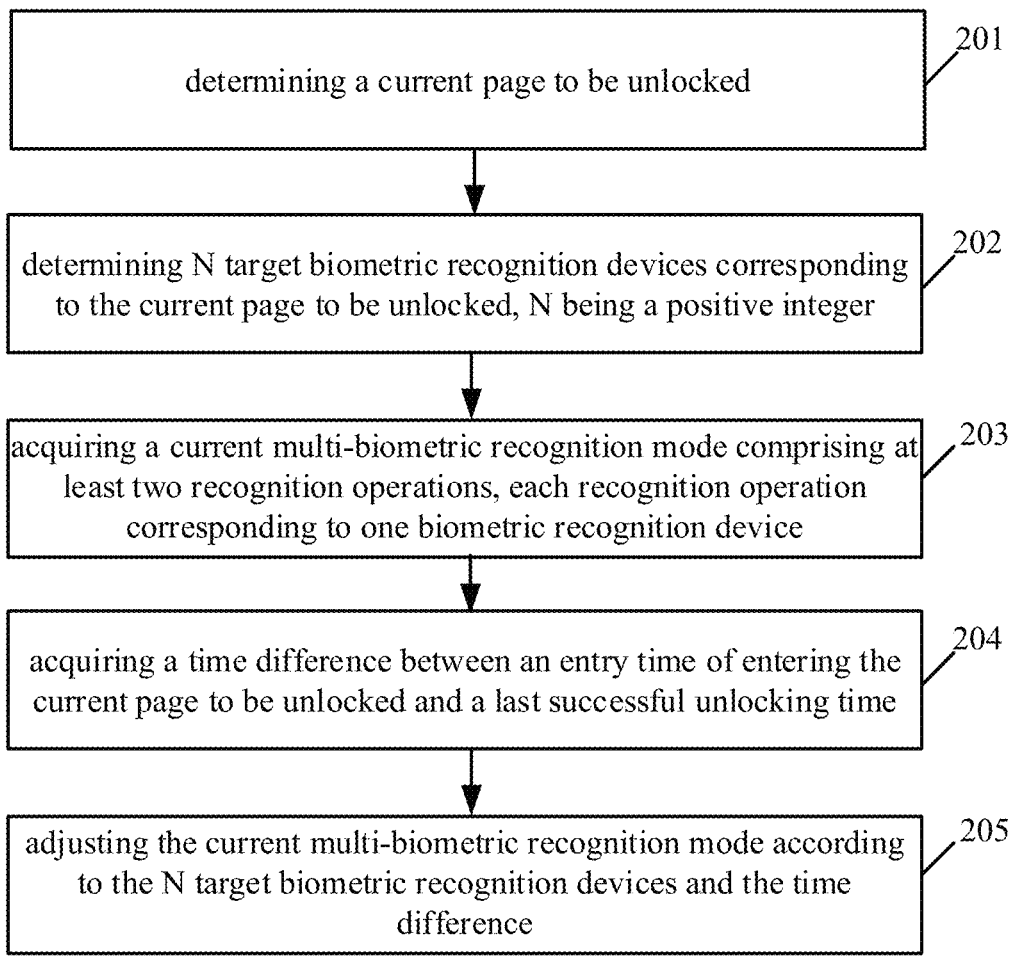
FIG. 2 is a flowchart of another unlocking control method according to an embodiment of the disclosure.

FIG. 2 is a schematic flowchart of an unlocking control method according to an embodiment of the disclosure. The unlocking control method described in this embodiment is applied to an electronic device, wherein its physical map and structural diagram are illustrated in FIG. 1A to FIG. 1C. The unlocking control method described in this embodiment includes the following steps.

At step 201, a current page to be unlocked is determined.

At step 202, N target biometric recognition devices corresponding to the current page to be unlocked are determined, where N is a positive integer.

At step 203, a current multi-biometric recognition mode is acquired, and the current multi-biometric recognition mode includes at least two recognition operations, each recognition operation corresponds to one kind of biometric recognition device.

Detailed description of the foregoing steps 201-203 may be referred to the corresponding steps of the unlocking control method described in FIG. 1D, and details are not described herein again.

At step 204, a time difference between an entry time of entering the current page to be unlocked and a last successful unlocking time, is acquired.

The running status of an application is monitored, so the entry time of entering the current page to be unlocked and the last successful unlocking time are obtained, and further a time difference between the entry time of entering the current page and the last successful unlocking time can be calculated.

At step 205, the current multi-biometric recognition mode is adjusted according to the time difference and the N target biometric recognition devices.

The shorter the time difference, the more frequently the user unlocks the application, and the safer the electronic device can be determined is. Therefore, a correspondence between the time differences and the recognition types of the biometric recognition devices can be preset in the electronic device, and the recognition type is used to indicate the purpose of the biometric recognition device. For example, the recognition type of the fingerprint recognition device is fingerprint recognition, and after determining the recognition type, the biometric recognition device corresponding to the recognition type may be hibernated or closed from the N target biometric recognition devices. Further, the current multi-biometric recognition mode is adjusted through the remaining target biometric recognition devices, so that the recognition operations of multi-biometric recognition mode can be simplified when the security is relatively high, it not only facilitates the user but the electronic device still maintains high security. That means, the current multi-biometric recognition mode may be adjusted in two steps. In a first step, one or more particular recognition types are acquired from the preset correspondence, and then one or more recognition devices corresponding to the one or more particular recognition types, are closed in the N target biometric recognition devices. In the second step, the current multi-biometric recognition mode is adjusted according to the remaining biometric recognition devices of the N target biometric recognition devices.

It can be seen that, in the embodiment of the disclosure, the current page to be unlocked is determined, and the N target biometric recognition devices corresponding to the current page to be unlocked are determined, where N is a positive integer. Then a current multi-biometric recognition mode is acquired, where the current multi-biometric recognition mode includes at least two recognition operations, each recognition operation corresponds to one kind of biometric recognition device. The time difference between the entry time of entering the current page to be unlocked and a last successful unlocking time, is acquired. Therefore, the current multi-biometric recognition mode is adjusted according to the N target biometric recognition devices and the time difference, and the current multi-biometric recognition mode is adjusted according to the time difference and the biometric recognition devices corresponding to the page to be unlocked, In this way, the problem, that the foldable and flexible display is inconvenient to operate in the folded state, can be solved.

Figure 3:
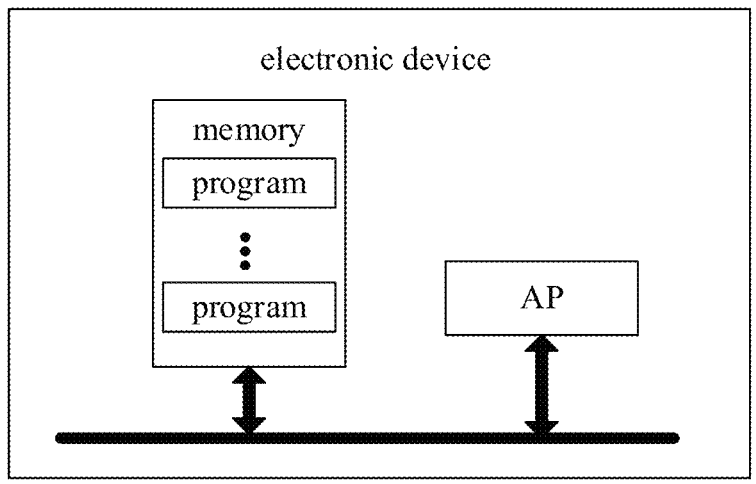
FIG. 3 is a schematic structural diagram of an electronic device according to an embodiment of the disclosure.

Referring to FIG. 3, FIG. 3 is an electronic device according to an embodiment of the disclosure. The electronic device includes an application processor AP, a memory; and one or more programs stored in the memory and executable by the AP. The one or more programs includes instructions for performing the following steps:

determining a current page to be unlocked;

determining N target biometric recognition devices corresponding to the current page to be unlocked, where N is a positive integer;

acquiring a current multi-biometric recognition mode, wherein the current multi-biometric recognition mode includes at least two recognition operations, each recognition operation corresponds to one kind of biometric recognition device; and adjusting the current multi-biometric recognition mode according to the N target biometric recognition devices.

In one embodiment, when determining N target biometric recognition devices corresponding to the current page to be unlocked, the program includes instructions configured to execute the following steps:

detecting that the current page to be unlocked is located in a hardware portion of the foldable and flexible display; and determining the N target biometric recognition devices based on the hardware portion.

In one embodiment, when adjusting the current multi-biometric recognition mode according to the N target biometric recognition devices, the program includes instructions configured to execute the following steps:

acquiring a target multi-biometric recognition mode corresponding to the N target biometric recognition devices, wherein the target biometric recognition mode includes at least one recognition operation, the at least one recognition operation corresponds to one of the N target biometric recognition devices;

comparing the target multi-biometric recognition mode with the current multi-biometric recognition mode; and replacing the current multi-biometric recognition mode with the target multi-biometric recognition mode when the target multi-biometric recognition mode is inconsistent with the current multi-biometric recognition mode.

In one embodiment, when acquiring the current multi-biometric recognition mode, the program includes instructions configured to execute the following steps:

acquiring a current geographic location; and determining the current multi-biometric recognition mode, according to a correspondence between predetermined geographic locations and multi-biometric recognition modes.

In one embodiment, the program further includes instructions configured to execute the following step:

acquiring a time difference between an entry time of entering the current page to be unlocked and a last successful unlocking time;

when adjusting the current multi-biometric recognition mode according to the N target biometric recognition devices, the program further includes instructions configured to execute the following step:

adjusting the current multi-biometric recognition mode according to the N target biometric recognition devices and the time difference.

Figure 4A:
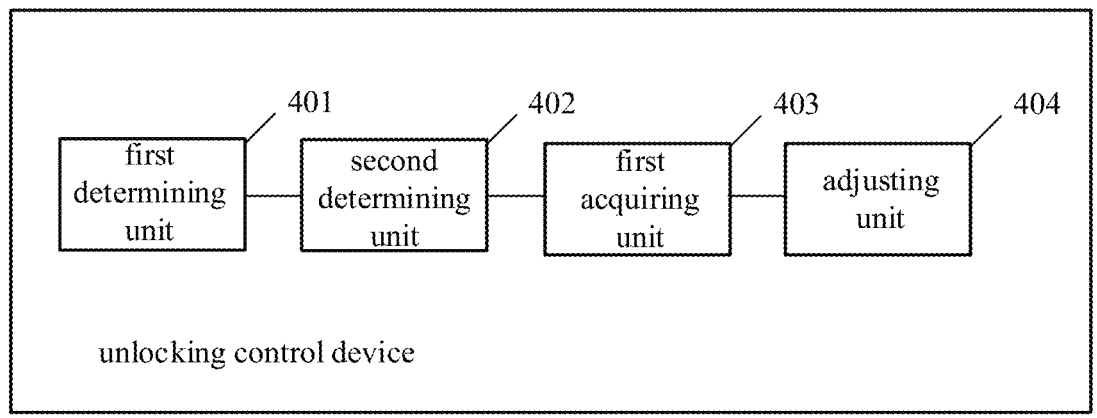
FIG. 4A is a schematic structural diagram of an unlocking control device according to an embodiment of the disclosure.

Referring to FIG. 4A, FIG. 4A is a schematic structural diagram of an unlocking control device according to one embodiment of the disclosure. The unlocking control device is applied in an electronic device, the electronic device includes a foldable and flexible display, and the unlocking control device includes a first determining unit 401, a second determining unit 402, a first acquiring unit 403 and an adjusting unit 404.

The first determining unit 401 is configured to determine a current page to be unlocked.

The second determining unit 402 is configured to determine N target biometric recognition devices corresponding to the current page to be unlocked, where N is a positive integer.

The first acquiring unit 403 is configured to acquire a current multi-biometric recognition mode, wherein the current multi-biometric recognition mode includes at least two recognition operations, each recognition operation corresponds to one kind of biometric recognition device.

The adjusting unit 404 is configured to adjust the current multi-biometric recognition mode according to the N target biometric recognition devices.

Figure 4B:
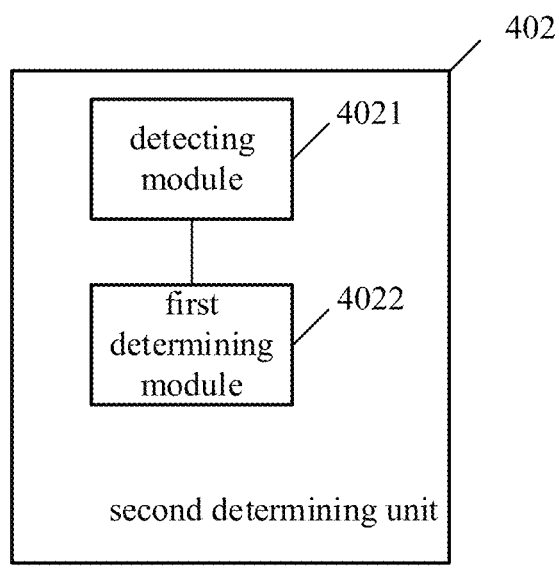
FIG. 4B is a schematic structural diagram of a second determining unit of the unlocking control device illustrated in FIG. 4A, according to an embodiment of the disclosure.

Optionally, as illustrated in FIG. 4B, FIG. 4B is a specific detailed structure of the second determining unit 402 of the unlocking control device of FIG. 4A. The second determining unit 402 may include: a detecting module 4021 and a first determining module 4022, details are as follows.

The detecting module 4021 is configured to detect that the current page to be unlocked is located in a hardware portion of the foldable and flexible display.

The first determining module 4022 is configured to determine the N target biometric recognition devices based on the hardware portion.

Figure 4C:
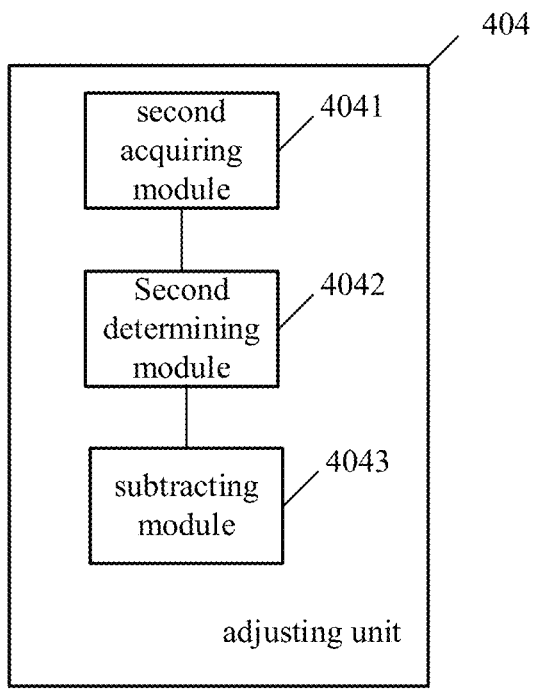
FIG. 4C is a schematic structural diagram of an adjusting unit of the unlocking control device illustrated in FIG. 4A, according to an embodiment of the disclosure.

Optionally, as illustrated in FIG. 4C, FIG. 4C is a specific detailed structure of the adjusting unit 404 of the unlocking control device of FIG. 4A. The adjusting unit 404 may include a second acquiring module 4041, a second determining module 4042 and a subtracting module 4043, and details are as follows.

The second acquiring module 4041 is configured to acquire M biometric recognition devices corresponding to the current multi-biometric recognition mode, where M is a positive integer.

The second determining module 4042 is configured to determine one or more recognition types that the M biometric recognition devices are not within the N target biometric devices, and thereby to obtain X recognition types, where X is a positive integer.

The subtracting module 4043 is configured to subtract one or more recognition operations corresponding to the X recognition types from the current multi-biometric recognition mode.

Figure 4D:
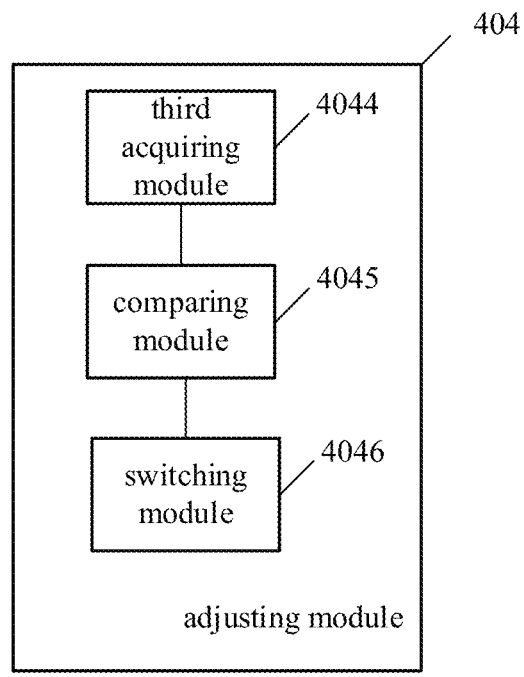
FIG. 4D is a schematic structural diagram of another adjusting unit of the unlocking control device illustrated in FIG. 4A, according to an embodiment of the disclosure.

Optionally, as illustrated in FIG. 4D, FIG. 4D is a specific detailed structure of the adjusting unit 404 of the unlocking control device of FIG. 4A. The adjusting unit 404 may include a third acquiring module 4044, a comparing module 4045 and a switching module 4046, and details are as follows.

The third acquiring module 4044 is configured to acquire a target multi-biometric recognition mode corresponding to the N target biometric recognition devices, wherein the target biometric recognition devices include at least one recognition operation, the at least one recognition operation corresponds to one of the N target biometric recognition devices.

The comparing module 4045 is configured to compare the target multi-biometric recognition mode with the current multi-biometric recognition mode.

The switching module 4046 is configured to switch the current multi-biometric recognition mode to the target multi-biometric recognition mode when the target multi-biometric recognition mode is inconsistent with the current multi-biometric recognition mode.

Figure 4E:
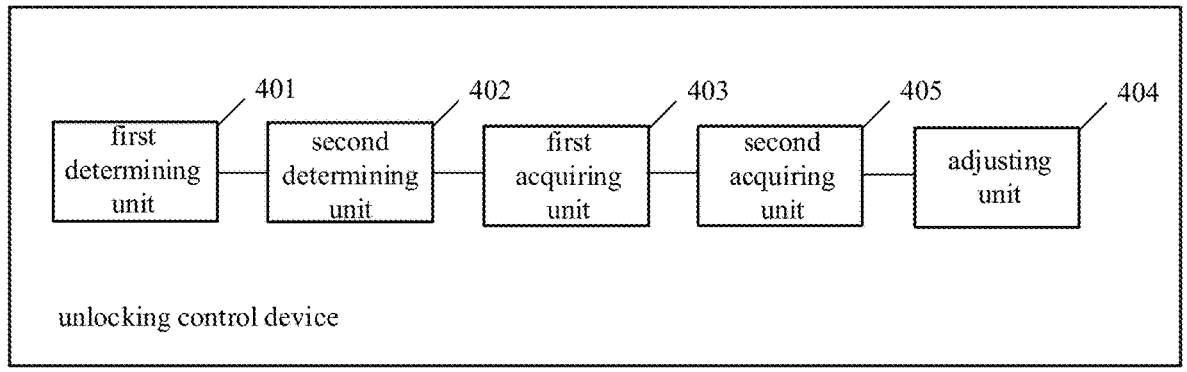
FIG. 4E is a schematic structural diagram of another unlocking control device according to an embodiment of the disclosure.

Optionally, as illustrated in FIG. 4E, FIG. 4E is a modified structure of the unlocking control device shown in FIG. 4A, and the device may further include a second acquiring unit 405 as follows.

The second acquiring unit 405 is configured to acquire a time difference between an entry time of entering the current page to be unlocked and a last successful unlocking time. The adjusting unit 404 is configured to adjust the current multi-biometric recognition mode according to the time difference and the N target biometric recognition devices.

Optionally, when acquiring the current multi-biometric recognition mode, the first acquiring unit 403 is specifically configured to:
acquire a current geographic location; and
determine the current multi-biometric recognition mode, according to a correspondence between predetermined geographic locations and multi-biometric recognition modes.

It can be seen that, in the embodiment of the disclosure, the current page to be unlocked is determined, and the N target biometric recognition devices corresponding to the current page to be unlocked are determined, where N is a positive integer. Then a current multi-biometric recognition mode is acquired, where the current multi-biometric recognition mode includes at least two recognition operations, each recognition operation corresponds to one kind of biometric recognition device. The current multi-biometric recognition mode is adjusted according to the N target biometric recognition devices, so that the current multi-biometric recognition mode can be adjusted, according to the biometric recognition devices corresponding to the page to be unlocked. In this way, the problem, that the foldable and flexible display is inconvenient to operate in the folded state, can be solved.

The functions of the program modules in the unlocking control device may be specifically implemented according to the method in the foregoing method embodiments. The specific implementation process may be referred to the descriptions of the foregoing method embodiments, and details are not described herein again.

Figure 5:
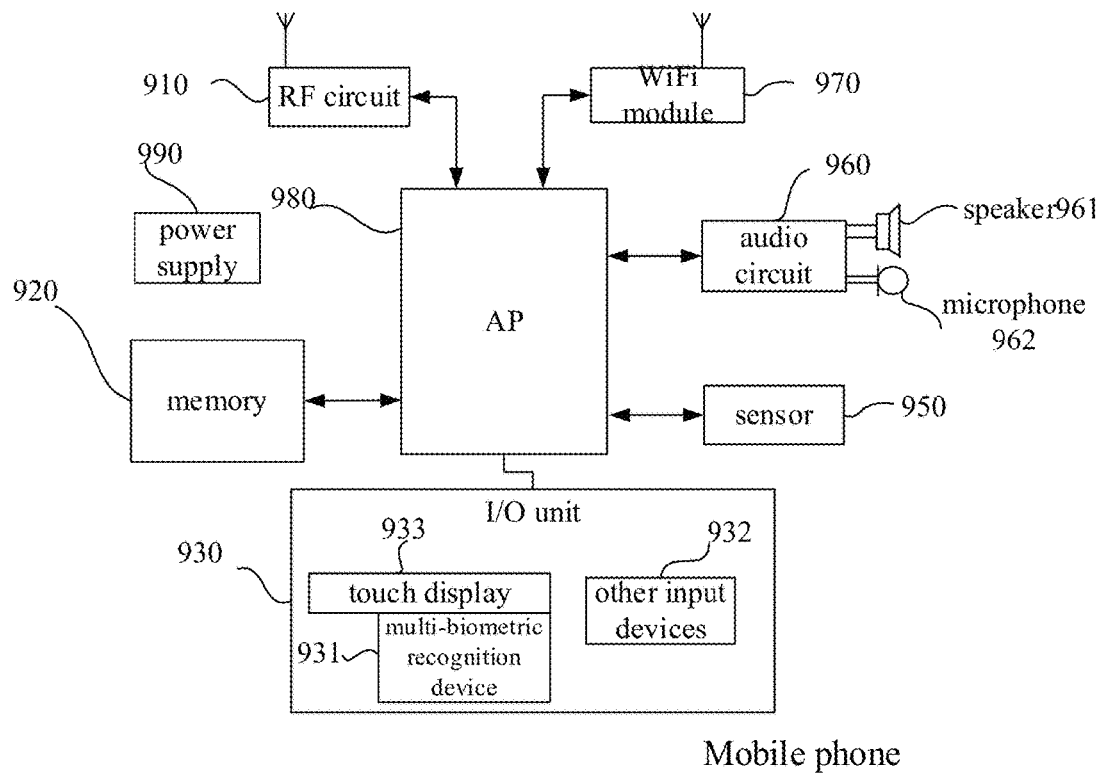
FIG. 5 is a schematic structural diagram of still another electronic device according to an embodiment of the disclosure.

FIG. 5 illustrates another electronic device, according to an embodiment of the disclosure. For the convenience of description, just the parts related to the embodiments of the disclosure are illustrated. The specific technical details not disclosed can be referred to the method embodiments of the disclosure. The electronic device may be any terminal device selected form a mobile phone, a tablet computer, a personal digital assistant (PDA), a point of sales (POS), an in-vehicle computer, and the like. The mobile phone is taken as an example.

FIG. 5 is a block diagram showing partial structure of a mobile phone related to an electronic device provided by an embodiment of the disclosure. Referring to FIG. 5, the mobile phone includes a radio frequency (RF) circuit 910, a memory 920, an input unit 930, a sensor 950, an audio circuit 960, a wireless fidelity (WiFi) module 970, an application processor (AP) 980, and a power supply 990 and the like. It will be understood by those skilled in the art that the structure of the mobile phone as shown in FIG. 5 does not constitute a limitation to the mobile phone, and the mobile phone may include more or less components than those illustrated, or a combination of certain components, or different component arrangements.

The following describes the components of the mobile phone in detail with reference to FIG. 5.

The input unit 930 can be used to receive input numeric or character information, as well as to generate signal inputs related to user settings and function controls. Specifically, the input unit 930 can include a touch display 933, a multi-biometric recognition device 931 and other input devices 932. The multi-biometric recognition device 931 at least includes two biometric recognition devices. The input unit 930 includes other input devices 932. Specifically, other input devices 932 may include, but are not limited to, one or more of a physical keyboard, function keys (such as volume control buttons, switch buttons, etc.), a trackball, a mouse, a joystick, and the like.

The AP 980 is configured to execute the operations of:
determining a current page to be unlocked;
determining N target biometric recognition devices corresponding to the current page to be unlocked, where N is a positive integer;
acquiring a current multi-biometric recognition mode, wherein the current multi-biometric recognition mode includes at least two recognition operations, each recognition operation corresponds to one kind of biometric recognition device; and
adjusting the current multi-biometric recognition mode according to the N target biometric recognition devices.

The AP 980 is the control center of the mobile phone, which connects various portions of the entire phone using various interfaces and lines, by performing or executing software programs and/or modules stored in the memory 920, and by invoking data stored in the memory 920, thereby implementing the various functions of the mobile phone and processing data to monitor the mobile phone. Optionally, the AP 980 may include one or more processing cores. Optionally, the AP 980 may integrate a modem processor, where the application processor mainly processes the operating system, the user interfaces, the applications, and the like, and the modem processor primarily handles wireless communications. It will be understood that the above described modem processor may also not be integrated into the AP 980.

Moreover, the memory 920 can include high speed random access memory, and can also include non-volatile memory, such as at least one magnetic disk storage device, flash memory device, or other volatile solid state storage device.

The RF circuit 910 can be used for transmitting and receiving messages. Generally, the RF circuit 910 includes, but is not limited to, an antenna, at least one amplifier, a tuner, one or more oscillators, a Subscriber Identity Module (SIM) card, a transceiver, a coupler, a low noise amplifier (LNA), and a duplexer, etc. In addition, the RF circuit 910 can also communicate with the network and other devices through wireless communication. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The mobile phone also can include at least one type of the sensor 950, such as a light sensor, a motion sensor, and other sensors. Specifically, the light sensor may include an ambient light sensor and a proximity sensor, wherein the ambient light sensor may adjust the brightness of the touch display according to the brightness of the ambient light, and the proximity sensor may close the touch display and/or the backlight when the mobile phone moves to the ear of the user. As a kind of motion sensor, a gravity acceleration sensor can detect the magnitude of acceleration in all directions (usually three axes). When it is stationary, it can detect the magnitude and direction of gravity. It can be used to identify the gesture of the mobile phone (such as horizontal and vertical screen switching, related games, magnetometer attitude calibrations), vibration recognition related functions (such as a pedometer, the tapping), etc. Other sensors such as gyroscopes, barometers, hygrometers, thermometers, infrared sensors, etc., also can be disposed in the mobile phone and are not detailed here.

The audio circuit 960, a speaker 961, and a microphone 962 can provide an audio interface between the user and the terminal 900. The audio circuit 960 can convert the received audio data into electrical signals and transmit the electrical signals to the speaker 961, the speaker 961 converts the electrical signals into sound signals and output the sound signals. On the other hand, the microphone 962 converts the collected sound signals into electrical signals, the electrical signals are received by the audio circuit 960 and then converted into audio data, the audio data is then processed by the AP 980, and then is sent to another terminal via the RF circuitry 910, or the audio data is output to the memory 920 for further processing.

WiFi is a short-range wireless transmission technology, and the mobile phone can help users to send and receive emails, browse web pages, and access streaming media through the WiFi module 970, which provides wireless broadband internet access for users. Although FIG. 5 shows the WiFi module 970, it can be understood that it is not the necessary configuration of the terminal, and may be omitted as needed within the scope of not changing the essence of the disclosure.

The mobile phone also includes the power supply 990 (such as a battery) that supplies power to the various components. Optionally, the power supply 990 can be logically coupled to the AP 980 through a power management system to manage functions such as charging, discharging, and power management.

Although not shown, the mobile phone may further include a camera, a Bluetooth module, and the like, and details are not described herein again.

In the foregoing embodiments shown in FIG. 1D and FIG. 2, each step, method, or operation can be implemented based on the structure of the mobile phone.

In the foregoing embodiments shown in FIG. 3 and FIG. 4A to FIG. 4E, the function of each unit can be implemented based on the structure of the mobile phone.

The embodiment of the disclosure further provides a computer storage medium, wherein the computer storage medium stores a computer program for electronic data exchange, the computer program enables the computer to execute a part of steps or all steps of any of the unlocking control method as described in the foregoing method embodiments.

The embodiment of the disclosure further provides a computer program product, which includes a non-transitory computer readable storage medium storing a computer program, the computer program being executable to enable a computer to perform a part of steps or all steps of the unlocking control method recited in the foregoing method embodiments.

It should be noted that, for simple description, the foregoing method embodiments are all described as a series of operation combinations, but those skilled in the art should understand that the disclosure is not limited by the described action sequence. Because certain steps may be performed in other sequences or concurrently, according to the embodiments of the disclosure. Those skilled in the art should also understand that the embodiments described in the specification are all preferred embodiments, and the operations and modules involved are not necessarily by the disclosure.

In the above embodiments, the description of every embodiment is different, and the details that are not described in a certain embodiment can be referred to the related descriptions of other embodiments.

In several embodiments of the disclosure, it should be understood that the disclosed device may be implemented in other manners. The device embodiments described above are merely illustrative. For example, the division of the unit is only a logical function division. In actual implementation, there may be another division manner, such as multiple units or components may be combined or may be integrated into another system, or some features can be omitted or not executed. In addition, the mutual coupling or direct coupling or communication connection shown or discussed may be an indirect coupling or communicating connection through some interfaces, devices or units, and may be electrical or other ways.

The units described as separate components maybe or maybe not physically separated, and the components shown as units maybe or maybe not physical units, that is, the component may be located in one place, or may be distributed to several network units. Some or all of the units may be selected according to actual needs to achieve the purpose of the solution of the embodiment.

Each functional unit in the embodiment of the disclosure may be integrated into one processing module, or each unit may exist physically separately, or two or more units may be integrated into one module. The above integrated modules can be implemented in the form of hardware or in the form of software functional modules.

The integrated modules, if implemented in the form of software functional modules and sold or used as stand-alone products, may also be stored in a computer readable storage medium. Based on such understanding, the technical solution of the disclosure, in essence or the contribution to the prior art, or all or part of the technical solution may be embodied in the form of a software product. The software product is stored in a memory, and includes a number of instructions configured to enable a computer device (may be a personal computer, a server or a network device, etc.) to perform all or part of the steps of the methods described in the embodiments of the disclosure. The foregoing memory includes a U disk, a read-only memory (ROM), a random access memory (RAM), a mobile hard disk, a magnetic disk, or an optical disk, and the like, that can store program codes.

A person skilled in the art can understand that all or part of the steps of the foregoing embodiments can be performed by a program to instruct related hardware, and the program can be stored in a computer readable memory, and the memory can include a flash drive, a ROM, a RAM, a disk or a CD.

The embodiments of the disclosure have been described in detail above. The principle and implementation of the disclosure are described in the specific examples. The description of the above embodiments is only used to help to understand the method and the spirit of the disclosure. Those skilled in the art may modify the specific embodiments and the scope of the application according to the spirit of the disclosure. In summary, the content of the specification should not be construed as limitations of the disclosure.

What is claimed is:

1. An electronic device, comprising a foldable and flexible display, an application processor, and a memory, the foldable and flexible display and the memory both being connected to the application processor, wherein the foldable and flexible display being in an unfolded state is capable of being used as a single display screen, the foldable and flexible display being in a folded state is capable of being used as a plurality of sub-display screens of displaying independently; wherein:

the foldable and flexible display is configured to, in the folded state of the foldable and flexible display, determine a current page to be unlocked, wherein the current page to be unlocked is a display page of a sub-display screen to be unlocked of the plurality of sub-display screens of displaying independently;

the memory is configured to store a current multi-biometric recognition mode, the current multi-biometric recognition mode is a preset multi-biometric recognition mode configured to unlock the single display screen under the unfolded state of the foldable and flexible display, the current multi-biometric recognition mode comprises at least two recognition operations, each recognition operation corresponds to a biometric recognition device; and the application processor is configured to, in the folded state of the foldable and flexible display:

determine N target biometric recognition devices corresponding to the current page to be unlocked from the biometric recognition devices corresponding to the at least two recognition operations, where N is a positive integer, acquire the current multi-biometric recognition mode, and adjust the current multi-biometric recognition mode for unlocking the display page of the sub-display screen to be unlocked according to the N target biometric recognition devices, wherein the biometric recognition devices corresponding to the at least two recognition operations are included in the foldable and flexible display being in the unfolded state, and after the foldable and flexible display is folded, the biometric recognition devices corresponding to the at least two recognition operations are included in the plurality of sub-display screens of displaying independently, and the sub-display screen to be unlocked includes the N target biometric recognition devices.

2. The electronic device according to claim 1, wherein the application processor is configured to, in the folded state of the foldable and flexible display:

detect that the current page to be unlocked is located in a hardware portion of the foldable and flexible display in the folded state; and determine the N target biometric recognition devices according to the hardware portion.

3. The electronic device according to claim 1, wherein the application processor is configured to, in the folded state of the foldable and flexible display:

acquire a current geographic location; and determine the current multi-biometric recognition mode, according to a preset correspondence between geographic locations and multi-biometric recognition modes.

4. The electronic device according to claim 1, wherein the application processor is configured to, in the folded state of the foldable and flexible display:

adjust the current multi-biometric recognition mode according to the N target biometric recognition devices and the biometric recognition devices corresponding to the at least two recognition operations to obtain an adjusted multi-biometric recognition mode;

wherein the adjusted multi-biometric recognition mode comprises: at least one recognition operation corresponding to the N target biometric recognition devices, the at least one recognition operation is included in the at least two recognition operations, and the adjusted multi-biometric recognition mode is configured to unlock the display page of the sub-display screen to be unlocked.

5. The electronic device according to claim 4, wherein the application processor is configured to, in the folded state of the foldable and flexible display:

obtain M biometric recognition devices corresponding to the current multi-biometric recognition mode, the M biometric recognition devices corresponding to M recognition types respectively, and M being a positive integer; wherein the M biometric recognition devices corresponding to the current multi-biometric recognition mode are the biometric recognition devices corresponding to the at least two recognition operations;

determine, based on the M recognition types and N recognition types corresponding to the respective N target biometric recognition devices, X recognition types that are differentiated from the N recognition types, X being a positive integer and X=M−N, and the N target biometric recognition devices being the biometric recognition devices included in a hardware portion corresponding to the current page to be unlocked under the folded state of the foldable and flexible display; and subtract X recognition operations corresponding to the X recognition types from the current multi-biometric recognition mode.

6. The electronic device according to claim 4, wherein the application processor is configured to, in the folded state of the foldable and flexible display:

acquire a target multi-biometric recognition mode corresponding to the N target biometric recognition devices from a plurality of pre-stored multi-biometric recognition modes; wherein each of the plurality of pre-stored multi-biometric recognition modes comprises at least one recognition operation, the at least one recognition operation of the target multi-biometric recognition mode corresponds to one of the N target biometric recognition devices, and the N target biometric recognition devices are the biometric recognition devices included in a hardware portion corresponding to the sub-display screen to be unlocked under the folded state of the foldable and flexible display;

compare the target multi-biometric recognition mode with the current multi-biometric recognition mode; and switch the current multi-biometric recognition mode to the target multi-biometric recognition mode when the target multi-biometric recognition mode is inconsistent with the current multi-biometric recognition mode.

7. An unlocking control method, comprising, in a folded state of a foldable and flexible display:
determining a current page to be unlocked of the foldable and flexible display being in the folded state, wherein the foldable and flexible display being in an unfolded state is capable of being used as a single display screen, the foldable and flexible display being in the folded state is capable of being used as a plurality of sub-display screens of displaying independently the current page to be unlocked is a display page of a sub-display screen to be unlocked of the plurality of sub-display screens of displaying independently in the folded state;
determining N target biometric recognition devices corresponding to the current page to be unlocked, N being a positive integer;
acquiring a current multi-biometric recognition mode, wherein the current multi-biometric recognition mode is a preset multi-biometric recognition mode configured to unlock the single display screen under the unfolded state of the foldable and flexible display, the current multi-biometric recognition mode comprises at least two recognition operations, each recognition operation corresponds to one kind of biometric recognition device, and the N target biometric recognition devices are included in the multiple kinds of biometric recognition devices corresponding to the at least two recognition operations; and
adjusting the current multi-biometric recognition mode according to the N target biometric recognition devices for unlocking the display page of the sub-display screen to be unlocked,
wherein the biometric recognition devices corresponding to the at least two recognition operations are included in the foldable and flexible display being in the unfolded state, and after the foldable and flexible display is folded, the biometric recognition devices corresponding to the at least two recognition operations are included in the plurality of sub-display screens of displaying independently, and the sub-display screen to be unlocked includes the N target biometric recognition devices.

8. The method according to claim 7, wherein the operation of determining N target biometric recognition devices corresponding to the current page to be unlocked comprises:
detecting that the current page to be unlocked is located in a hardware portion of a foldable and flexible display; and
determining the N target biometric recognition devices according to the hardware portion.

9. The method according to claim 7, wherein the operation of acquiring the current multi-biometric recognition mode comprises:
acquiring a current geographic location; and
determining the current multi-biometric recognition mode, according to a preset correspondence between geographic locations and multi-biometric recognition modes.

10. The method according to claim 9, wherein different geographic locations correspond to different multi-biometric recognition modes.

11. The unlocking control method according to claim 7, wherein the adjusting the current multi-biometric recognition mode according to the N target biometric recognition devices for unlocking the display page of the sub-display screen to be unlocked, comprises:
adjust the current multi-biometric recognition mode according to the N target biometric recognition devices and the biometric recognition devices corresponding to the at least two recognition operations to obtain an adjusted multi-biometric recognition mode;
wherein the adjusted multi-biometric recognition mode comprises: at least one recognition operation corresponding to the N target biometric recognition devices, the at least one recognition operation is included in the at least two recognition operations, and the adjusted multi-biometric recognition mode is configured to unlock the display page of the sub-display screen to be unlocked.

12. The unlocking control method according to claim 11, wherein the operation of the adjusting the current multi-biometric recognition mode according to the N target biometric recognition devices for unlocking the display page of the sub-display screen to be unlocked comprises:
acquiring a target multi-biometric recognition mode corresponding to the N target biometric recognition devices from a plurality of pre-stored multi-biometric recognition modes; wherein each of the plurality of pre-stored multi-biometric recognition modes comprises at least one recognition operation, the at least one recognition operation of the target multi-biometric recognition mode corresponds to one of the N target biometric recognition devices, and the N target biometric recognition devices are the biometric recognition devices included in a hardware portion corresponding to the current page to be unlocked under the folded state of the foldable and flexible display;
comparing the target multi-biometric recognition mode with the current multi-biometric recognition mode; and
switching the current multi-biometric recognition mode to the target multi-biometric recognition mode when the target multi-biometric recognition mode is inconsistent with the current multi-biometric recognition mode.

13. The unlocking control method according to claim 11, wherein the operation of the adjusting the current multi-biometric recognition mode according to the N target biometric recognition devices for unlocking the display page of the sub-display screen to be unlocked comprises:
obtaining M biometric recognition devices corresponding to the current multi-biometric recognition mode, the M biometric recognition devices corresponding to M recognition types respectively, and M being a positive integer; wherein the M biometric recognition devices corresponding to the current multi-biometric recognition mode are the biometric recognition devices corresponding to the at least two recognition operations;
determining, based on the M recognition types and N recognition types corresponding to the respective N target biometric recognition devices, X recognition types that are differentiated from the N recognition types, X being a positive integer and X=M−N, and the N target biometric recognition devices being the biometric recognition devices included in a hardware portion corresponding to the current page to be unlocked under the folded state of the foldable and flexible display; and
subtracting X recognition operations corresponding to the X recognition types from the current multi-biometric recognition mode.

14. An electronic device, comprising a foldable and flexible display, an application processor, a memory and one or more programs, wherein the one or more programs are stored in the memory and is executable by the application processor, the application processor performs an unlocking control method in a folded state of a foldable and flexible display when executing the one or more programs, the foldable and flexible display being in an unfolded state is capable of being used as a single display screen, the foldable and flexible display being in the folded state is capable of being used as a plurality of sub-display screens of displaying independently, and the method comprises:

determining a current page to be unlocked of the foldable and flexible display being in the folded state, wherein the current page to be unlocked is a display page of a sub-display screen to be unlocked of the plurality of sub-display screens of displaying independently;

determining N target biometric recognition devices corresponding to the current page to be unlocked, N being a positive integer;

acquiring a current multi-biometric recognition mode, wherein the current multi-biometric recognition mode is a preset multi-biometric recognition mode configured to unlock the single display screen under the unfolded state of the foldable and flexible display, the current multi-biometric recognition mode comprises at least two recognition operations, each recognition operation corresponds to one kind of biometric recognition device, and the N target biometric recognition devices are included in the multiple kinds of biometric recognition devices corresponding to the at least two recognition operations; and adjusting the current multi-biometric recognition mode according to the N target biometric recognition devices for unlocking the display page of the sub-display screen to be unlocked, wherein the biometric recognition devices corresponding to the at least two recognition operations are included in the foldable and flexible display being in the unfolded state, and after the foldable and flexible display is folded, the biometric recognition devices corresponding to the at least two recognition operations are included in the plurality of sub-display screens of displaying independently, and the sub-display screen to be unlocked includes the N target biometric recognition devices.

15. The electronic device according to claim 14, wherein the adjusting the current multi-biometric recognition mode according to the N target biometric recognition devices for unlocking the display page of the sub-display screen to be unlocked, comprises:

adjusting the current multi-biometric recognition mode according to the N target biometric recognition devices and the biometric recognition devices corresponding to the at least two recognition operations to obtain an adjusted multi-biometric recognition mode;

wherein the adjusted multi-biometric recognition mode comprises: at least one recognition operation corresponding to the N target biometric recognition devices, the at least one recognition operation is included in the at least two recognition operations, and the adjusted multi-biometric recognition mode is configured to unlock the display page of the sub-display screen to be unlocked.

16. The electronic device according to claim 15, wherein the operation of the adjusting the current multi-biometric recognition mode according to the N target biometric recognition devices for unlocking the display page of the sub-display screen to be unlocked comprises:

acquiring a target multi-biometric recognition mode corresponding to the N target biometric recognition devices from a plurality of pre-stored multi-biometric recognition modes; wherein each of the plurality of pre-stored multi-biometric recognition modes comprises at least one recognition operation, the at least one recognition operation of the target multi-biometric recognition mode corresponds to one of the N target biometric recognition devices, and the N target biometric recognition devices are the biometric recognition devices included in a hardware portion corresponding to the current page to be unlocked under the folded state of the foldable and flexible display;

comparing the target multi-biometric recognition mode with the current multi-biometric recognition mode; and switching the current multi-biometric recognition mode to the target multi-biometric recognition mode when the target multi-biometric recognition mode is inconsistent with the current multi-biometric recognition mode.

17. The electronic device according to claim 15, wherein the operation of the adjusting the current multi-biometric recognition mode according to the N target biometric recognition devices for unlocking the display page of the sub-display screen to be unlocked comprises:

obtaining M biometric recognition devices corresponding to the current multi-biometric recognition mode, the M biometric recognition devices corresponding to M recognition types respectively, and M being a positive integer; wherein the M biometric recognition devices corresponding to the current multi-biometric recognition mode are the biometric recognition devices corresponding to the at least two recognition operations;

determining, based on the M recognition types and N recognition types corresponding to the respective N target biometric recognition devices, X recognition types that are differentiated from the N recognition types, X being a positive integer and $X=M-N$, and the N target biometric recognition devices being the biometric recognition devices included in a hardware portion corresponding to the current page to be unlocked under the folded state of the foldable and flexible display; and subtracting X recognition operations corresponding to the X recognition types from the current multi-biometric recognition mode.

\* \* \* \* \*